United States Patent Office 3,732,296

Patented May 8, 1973

3,732,296
PREPARATION OF AROMATIC ACIDS

Stephen N. Massie, Palatine, Ill., assignor to Universal Oil Products Company, Des Plaines, Ill.

No Drawing. Filed May 5, 1971, Ser. No. 140,626
Int. Cl. C07c 63/02
U.S. Cl. 260—524 R 9 Claims

ABSTRACT OF THE DISCLOSURE

Aromatic acids such as benzoic acid may be prepared by treating an alkylaromatic compound such as toluene in an oxygen-containing gas in the presence of a catalyst comprising a mixture of an iron halide and a thallium-containing compound at oxidation conditions, the use of such a catalyst resulting in the recovery of improved yields of the desired product.

This invention relates to a process for preparing aromatic acids and particularly to a process for obtaining improved yields of the desired aromatic acid by effecting the process in the presence of certain compositions of matter.

Aromatic acids are important compounds in the chemical industry today. For example, benzoic acid is used as a mordant in calico printing, seasoning tobacco and improving the aroma thereof, in flavors, perfumes, dentifrices, in medicine as a germicide, food packaging, textiles, dyes and as a plasticizer and resin intermediate. Likewise, the isomeric phthalic acids are important chemical compounds, ortho-phthalic acid (also known as phthalic acid( being used in dyes such as the synthesis of indigo, the manufacture of phthaleins, various fluorescein and eosin dyes, rhodamines and pyronine dyes; in medicine and synthetic perfumes. The anhydride of this acid is used in the preparation of alkyl resins, plasticizers, polyesters, as an intermediate in the preparation of pharmaceuticals and insecticides, etc. Isophthalic acid is also used as a component in polyester and polyurethane resins. Para-phthalic acid which is known as terephthalic acid is an important intermediate in the production of synthetic resins, fibers and films by combination of glycols, a particularly important fiber being the various nylons. Other polycarboxylic aromatic acids which may be prepared according to the process of this invention will include trimesic acid or pyromellitic acid, etc. These acids and the anhydride thereof such as pyromellitic dianhydride being useful as plasticizers in the preparation of water-based resins, epoxy molding compounds, etc.

It is therefore an object of this invention to provide a process for preparing aromatic acids.

A further object of this invention is to provide a process for obtaining improved yields of aromatic acids when utilizing an alkylaromatic compound as the starting material by effecting said process in the presence of certain compositions of matter hereinafter set forth in greater detail.

In one respect an embodiment of this invention resides in a process for the preparation of an aromatic acid which comprises treating an alkylaromatic compound with an oxygen-containing gas in the presence of a catalyst comprising a mixture of an iron halide and a thallium-containing compound at oxidation conditions, and recovering the resultant aromatic acid.

A specific embodiment of this invention is found in the process for the preparation of an aromatic acid which comprises treating toluene with air in the presence of a catalyst comprising a mixture of ferric bromide and thallium benzoate at a temperature in the range of from about 100° to about 250° C. and a pressure in the range of from about ambient to about 2,000 pounds per square inch, and recovering the resultant benzoic acid.

Other objects and embodiments will be found in the following further detailed description of the present invention.

As hereinbefore set forth the present invention is directed to a process for obtaining improved yields of aromatic acids. In this respect it has now been unexpectedly discovered that the yields of desired oxidation products resulting from the treatment of alkylaromatic compounds, and particularly alkylaromatic hydrocarbons, with an oxygen-containing gas may be greatly enhanced if the reaction is effected in the presence of certain catalytic compositions of matter of the type hereinafter set forth in greater detail. Examples of alkylaromatic compounds and particularly aromatic hydrocarbons which are treated with the aforementioned oxygen-containing gas will include both mono- and polyalkyl-substituted aromatics. Of the aromatic compounds containing the alkyl substituents benzene comprises the preferred aromatic nucleus, although it is also contemplated within the scope of this invention that polynuclear aromatic hydrocarbons containing alkyl substituents such as the mono- and polyalkylated naphthalenes, anthracenes, phenanthrenes, chrysenes, pyrenes, etc. may also be used, although not necessarily with equivalent results. Specific examples of mono- and polyalkyl-substituted aromatic compounds will include toluene, ethylbenzene, n-propylbenzene, isopropylbenzene (cumene), o-xylene, m-xylene, p-xylene, 1,3,5-trimethylbenzene (mesitylene), 1,2,4-trimethylbenzene (pseudocumene), 1,2,3-trimethylbenzene (hemimellitene), 1,2,4,5-tetramethylbenzene (durene), 1,2,3,5-tetramethylbenzene (isodurene), 1,2,3,4-tetramethylbenzene (prehnitene), pentamethylbenzene, hexamethylbenzene, 1-methylnaphthalene, 2-methylnaphthalene, etc. It is to be understood that the forementioned alkyl-substituted aromatic hydrocarbons are only representative of the class of compounds which may be oxidized to the corresponding aromatic acids and that the present invention is not necessarily limited thereto.

The reaction conditions under which the alkylaromatic compound is treated with an oxygen-containing gas such as air or oxygen, and preferably the former due to the readily greater availability and lower cost thereof, in the presence of certain catalytic compositions of matter will include elevated temperatures ranging from about 100° to about 250° C. or more. In addition, pressures ranging from about ambient up to about 2,000 or more pounds per square inch may be utilized. Normally speaking, the superatmospheric pressures are provided for by the presence of the oxygen-containing gas in the reaction vessel. However, it is also contemplated within the scope of this invention that the oxygen-containing gas may provide only a partial pressure, the remainder of the desired operating pressure being provided for by the introduction of a substantially inert gas such as nitrogen into the reaction zone. Generally speaking, the amount of alkylaromatic hydrocarbon which is to be treated with the oxygen-containing gas will be found in excess over that of said oxygen-containing gas, usually being in a range of from about 2:1 to about 5:1 mols of alkylaromatic hydrocarbon per mol of oxygen.

Examples of catalytic compositions of matter which may be utilized to obtain improved yields of desirable oxidation products produced by the process of this invention will include a mixture of an iron salt, and particularly an iron halide and a thallium-containing compound said components being usually present in equimolar quantities. Of the iron halide salts, ferric chloride and ferric bromide constitute the preferred iron component of the catalyst although it is also contemplated that ferrous chloride and ferrous bromide may also be employed. Examples of thallium-containing compounds which constitute the other component of the catalytic mixture will preferably comprise an organo thallium compound such as the salts of organic acids including thallium formate, thallium acetate, thallium propionate, thallium butyrate, thallium valerate, thallium cyclohexanoate, thallium benzoate, thallium toluate, etc. As will be hereinafter shown in greater detail the use of these mixtures of an iron halide and a thallium-containing compound will permit recovery of a larger amount of the desired aromatic acid that is obtained when using each of the components separately. It is to be understood that the aforementioned iron compounds and thallium-containing compounds are only representative of the class of compounds which may be employed as catalytic compositions of matter, and that the present invention is not necessarily limited thereto.

The process of this invention may be effected in any suitable manner and may comprise either a batch or continuous type operation. For example, when a batch type operation is used, a quantity of the alkylaromatic hydrocarbon is placed in an appropriate apparatus such as, for example, an autoclave of the rotating or mixing type, said autoclave containing the catalyst of the type hereinbefore set forth in greater detail. In addition, if so desired, a solvent may also be present in the autoclave, although said solvent is not an absolute requirement for the process for this invention. The solvent may comprise a low molecular weight alcohol such as methyl alcohol, ethyl alcohol, propyl alcohol, or low molecuar organic acid such as acetic acid or propionic acid. The autoclave is sealed and the oxygen-containing gas is pressed into the reactor until the desired operating pressure has been reached. Following this, the autoclave and contents thereof are then heated to the desired operating temperature and maintained thereat for a predetermined period of time which may range from about 0.5 up to about 20 hours or more in duration. Upon completion of the desired residence time, heating is discontinued and the apparatus is allowed to return to room temperature. Any excess pressure which may still be present is discharged, the autoclave is opened and the reaction product is recovered therefrom. The reaction mixture is separated from the catalyst, if the latter is in solid form, by conventional means such as filtration, following which the mixture is extracted with alkali and thereafter recovered with acidification and further extracted. It is also contemplated that the reaction may be effected with a batch type operation by utilizing a catalyst composite which is soluble in the solvent employed. The apparatus to be employed may then comprise a flask in which the alkylaromatic hydrocarbon, the solvent and the catalyst are heated to reflux, air is introduced below the surface of the reaction mixture, and the reaction allowed to proceed at a very low pressure.

The process of this invention may also be effected in a continuous manner of operation. When this type of operation is used, the alkylaromatic hydrocarbon is continuously charged to the reactor which is maintained at the proper operating conditions of temperature and pressure, said reactor containing the catalyst. In addition, the oxygen-containing gas is also continuously charged to the reactor through a separate line. While this demonstrates one particular mode of operation, it is to be understood that variations thereof may be employed to effect the reaction, said variations including the use of a solvent which may be charged to the reactor through a separate line or admixed with the alkylaromatic hydrocarbon, as well as the use of catalyst salts which are soluble in said solvent, the catalyst then being charged to the reactor as a solution in the solvent. In addition, it is to be understood that various types of continuous methods of operations may be employed when utilizing a catalyst composition in a solid state. For example, if the catalyst is in solid form, a fixed bed type of operation may be employed in which the catalyst is dispersed as a fixed bed in the catalyst and the alkylaromatic hydrocarbon passes through said bed of catalyst in either an upward or downward flow while being contacted with the oxygen-containing gas. Another type of continuous operation which may be employed is the moving bed type in which the catalyst and the reactant comprising the alkylaromatic hydrocarbon are passed through the reaction zone either concurrently or countercurrently to each other while said alkylaromatic hydrocarbon is being contacted with the oxygen-containing gas. Yet another type of operation which may be employed when the catalyst is in solid form and is not soluble in the solvent, if one is to be employed, comprises the slurry technique in which the catalyst is carried into the reactor as a slurry in the alkylaromatic hydrocarbon. Upon completion of the predetermined residence time, the reactor effluent is continuously withdrawn from the reactor and is subjected to conventional means for separation whereby the unreacted alkylaromatic hydrocarbon is recycled to the reaction zone to form a portion of the feed stock, while the desired aromatic acid, is removed to storage.

Some specific examples of aromatic acids which may be prepared by utilizing the process of this invention will include benzoic acid which may be prepared from toluene, ethylbenzene, n-propylbenzene, phthalic acid which may be obtained as the acid or which may be simultaneously or subsequently dehydrated to form the corresponding phthalic anhydride; isophthalic acid; terephthalic acid; trimesic acid; trimellitic acid and its corresponding trimellitic anhydride; 1,2,3-benzenetricarboxylic acid; 1,2,4,5-benzenetetracarboxylic acid and its corresponding pyromellitic dianhydride; 1,2,3,5-benzenetetracarboxylic acid; 1,2,3,4-benzenetetracarboxylic acid; etc. It is to be understood that these acids are only representative of the class of aromatic acids which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 60 g. of toluene was placed in the glass liner of a rotating autoclave along with 2.0 g. of a catalyst composition of matter comprising a mixture of 1 g. of ferric bromide and 1 g. of thallium benzoate. The liner was sealed into the autoclave and air pressed in until an initial operating pressure of 525 pounds per square inch was reached. The autoclave was then heated to a temperature of 180° C. and maintained thereat for a period of 16 hours during which time the pressure rose to 800 pounds per square inch. At the end of the 16-hour period, heating was discontinued and the autoclave allowed to return to room temperature, the final pressure at room temperature being 438 pounds per square inch. The excess pressure was discharged, the autoclave was opened and the reaction mixture was recovered therefrom. The mixture was separated from the catalyst and subjected to a gas-liquid chromatographic analysis. This analysis disclosed the presence of 202 mmols of benzoic acid per mol of oxygen charged to the reaction.

EXAMPLE II

To illustrate the unexpected activity of the catalyst composition of the present application, a series of other experiments were performed in which the catalyst utilized to effect the oxidation was varied. In one experiment 60 g. of toluene was charged to the glass liner of a rotating autoclave containing 2 g. of a ferric bromide catalyst. The autoclave was sealed and air pressed in until an initial operating pressure of 525 pounds per square inch were reached. Thereafter the autoclave was heated to a temperature of 180° C. and maintained thereat for a period of 16 hours, the maximum pressure during this run reaching 690 pounds per square inch. At the end of the 16 hour period heating was discontinued, the autoclave was allowed to return to room temperature, the excess pressure was discharged and the autoclave was opened. After recovery of the reaction mixture and separation from the catalyst, the mixture was subjected to a gas-liquid chromatographic analysis, said analysis disclosed the presence of 138 mmols of benzoic acid per mol of oxygen charged to the reaction.

The above experiment was repeated by charging 60 g. of toluene to the glass liner of a rotating autoclave which contained 2 g. of a catalyst comprising thallium benzoate. As in the previous paragraph, the autoclave was sealed and air pressed in until an initial operating pressure of 525 pound per square inch was reached. The autoclave was heated to a temperature of 180° C. and maintained thereat for a period of 16 hours, the maximum pressure at this temperature being 760 pounds per square inch. After discontinuance of the heating and return of the autoclave to room temperature, the final pressure at room temperature being 475 pounds per square inch, the excess pressure was discharged and the autoclave was opened. The reaction mixture was recovered, separated from the catalyst and subjected to analysis of the type similar to that hereinbefore set forth. This analysis disclosed the presence of 154 mmols of benzoic acid per mol of oxygen charged to the reaction.

It is therefore apparent from a comparison of the experiments performed in Examples I and II that the utilization of a catalyst composition consisting of a mixture of ferric bromide and thallium benzoate permits the recovery of much greater yield of the desired benzoic acid than is obtained when utilizing only one component of the binary catalyst system.

EXAMPLE III

In this example 60 g. of o-xylene is charged to the reaction zone containing a catalyst comprising 2 g. of a ferric bromide-thallium benzoate mixture. The autoclave is sealed and air is pressed in until an initial operating pressure of 550 pounds per square inch in reached. The autoclave is is then heated to a temperature of 180° C. and maintained thereat for a period of 16 hours during which time the maximum pressure will reach about 800 pounds per square inch. At the end of the residence time, heating is discontinued, the autoclave is allowed to return to room temperature and the excess pressure is discharged. The autoclave is opened and the reaction mixture is recovered therefrom. After separation from the catalyst, the mixture is subjected to analysis which will disclose the presence of a mixture of phthalic acid, o-toluic acid, o-tolualdehyde and o-tolyl carbinol, the amount of the acid being greater than that which is obtained when oxidizing o-xylene in the presence of other catalysts two components similar in nature to the binary composition of matter set forth above.

EXAMPLE IV

In like manner 60 g. of m-xylene is charged to the glass liner of a rotating autoclave which contains 2 g. of a binary catalyst composite comprising 1 g. of ferric chloride and 1 g. of thallium acetate. The liner is sealed into the autoclave and air is pressed in until an initial operating pressure of 525 pounds per square inch is reached. Thereafter, the autoclave is heated to a temperature of 200° C. and maintained thereat for a period of 10 hours. At the end of this 10 hour period, heating is discontinued, the autoclave is allowed to return to room temperature, and the excess pressure is discharged therefrom. Following this, the autoclave is opened and the reaction mixture is recovered therefrom and separated from the catalyst by means of filtration. Analysis of the mixture will disclose the presence of isophthalic acid, m-toluic acid, m-tolualdehyde and m-tolyl carbinol in an amount greater than that which is obtained when utilizing only ferric chloride or thallium acetate separate as the catalyst for the reaction.

EXAMPLE V

In this example 60 g. of p-xylene is charged to the glass liner of a rotating autoclave which contains 2 g. of a binary catalyst composite consisting of a mixture of 1 g. of ferric bromide and 1 g. of thallium benzoate. After sealing the liner into the autoclave, oxygen is pressed in until an initial operating pressure of 500 pounds per square inch is reached. The autoclave is then heated to a temperature of 180° C. and maintained thereat for a period of 16 hours, the maximum pressure during this period reaching about 750 pounds per square inch. At the end of the 16 hour residence time, heating is discontinued and the autoclave is allowed to return to room temperature. The excess pressure is discharged, the autoclave is opened and the reaction mixture is recovered therefrom. After separation from the catalyst by means of filtration, the mixture is subject to gas-liquid chromatographic analysis, said analysis disclosing the presence of a greater amount of terephthalic acid, p-toluic acid, p-tolualdehyde and p-tolyl carbinol than that which is obtained when oxidizing toluene in the presence of a catalyst comprising ferric bromide or catalyst comprising thallium benzoate.

I claim as my invention:

1. A process for the preparation of an aromatic acid which comprises treating an alkylaromatic compound with an oxygen-containing gas in the presence of a catalyst consisting essentially of a mixture of an iron halide and a thallium-containing compound at oxidation conditions including a temperature in the range of from about 100° to about 250° C. and a pressure in the range of from about ambient to about 2,000 pounds per square inch, and recovering the resultant aromatic acid.

2. The process as set forth in claim 1 in which said oxygen-containing gas is air.

3. The process as set forth in claim 1 in which said oxygen-containing gas is oxygen.

4. The process as set forth in claim 1 in which said iron halide is ferric bromide.

5. The process as set forth in claim 1 in which said thallium-containing compound is thallium benzoate.

6. The process as set forth in claim 1 in which said alkyl-aromatic compound is toluene and said aromatic acid is benzoic acid.

7. The process as set forth in claim 1 in which said alkylaromatic compound is o-xylene and said aromatic acid is a mixture of phthalic acid and o-toluic acid.

8. The process as set forth in claim 1 in which said alkylaromatic compound is m-xylene and said aromatic acid is a mixture of isophthalic acid and m-toluic acid.

9. The process as set forth in claim 1 in which said alkylaromatic compound is p-xylene and said aromatic acid is a mixture of terephthalic acid and p-toluic acid.

References Cited

FOREIGN PATENTS 835,733 5/1960 Great Britain ________ 260—524

LORRAINE A. WEINBERGER, Primary Examiner

R. S. WEISSBERG, Assistant Examiner